US011513084B2

(12) United States Patent
Nagano et al.

(10) Patent No.: US 11,513,084 B2
(45) Date of Patent: Nov. 29, 2022

(54) NONDESTRUCTIVE INSPECTING SYSTEM, AND NONDESTRUCTIVE INSPECTING METHOD

(71) Applicants: Topcon Corporation, Tokyo (JP); RIKEN, Saitama (JP)

(72) Inventors: Shigenori Nagano, Saitama (JP); Hanako Aikoh, Tokyo (JP); Yoshie Otake, Wako (JP); Yuichi Yoshimura, Wako (JP); Hideyuki Sunaga, Wako (JP)

(73) Assignees: Topcon Corporation, Tokyo (JP); RIKEN, Saitama (JP)

( * ) Notice: Subject to any disclaimer, the term of this patent is extended or adjusted under 35 U.S.C. 154(b) by 34 days.

(21) Appl. No.: 17/280,158

(22) PCT Filed: Sep. 25, 2019

(86) PCT No.: PCT/JP2019/037501
§ 371 (c)(1),
(2) Date: Mar. 25, 2021

(87) PCT Pub. No.: WO2020/067115
PCT Pub. Date: Apr. 2, 2020

(65) Prior Publication Data
US 2022/0003690 A1    Jan. 6, 2022

(30) Foreign Application Priority Data

Sep. 27, 2018    (JP) .............................. JP2018-182814

(51) Int. Cl.
*G01T 3/08*    (2006.01)
*G01N 23/05*   (2006.01)
(Continued)

(52) U.S. Cl.
CPC ........... *G01N 23/05* (2013.01); *G01N 23/204* (2013.01); *G01N 23/20008* (2013.01); *G01T 3/00* (2013.01); *G01T 7/00* (2013.01)

(58) Field of Classification Search
CPC ............. G01N 23/05; G01N 23/20008; G01N 23/204; G01T 3/00; G01T 7/00
See application file for complete search history.

(56) References Cited

U.S. PATENT DOCUMENTS

2001/0046274 A1   11/2001  Craig et al.
2009/0272906 A1*  11/2009  Gratton ................ G01V 5/0008
                                              250/370.05
(Continued)

FOREIGN PATENT DOCUMENTS

CN    106717132 A    5/2017
CN    109565923 A    4/2019
(Continued)

OTHER PUBLICATIONS

International Search Report and Written Opinion dated Dec. 17, 2019, in connection with International Patent Application No. PCT/JP2019/037501, 13 pgs (including translation).
(Continued)

*Primary Examiner* — Kiho Kim
(74) *Attorney, Agent, or Firm* — Chiesa Shahinian & Giantomasi PC

(57) ABSTRACT

A non-destructive inspection system 1 includes a neutron detecting unit 4 and an arithmetic unit 60. The neutron detecting unit 4 includes a collimator 30 and a neutron detector 20 integrated together. The collimator 30 has a wall defining a through passage P. The wall is made from a material that absorbs neutrons produced via an inspection object. The neutron detector 20 is capable of detecting neutrons that have passed through the collimator 30. The arithmetic unit 60 generates information on a position and
(Continued)

composition of the inspection object, based on information on the neutrons detected by the neutron detector 20, positional information indicating the position of the neutron detecting unit 4, and posture information indicating the posture of the neutron detecting unit 4. The positional information and the posture information are detected by a position and posture detecting unit 5.

10 Claims, 9 Drawing Sheets

(51) Int. Cl.
  *G01N 23/20008* (2018.01)
  *G01N 23/204* (2006.01)
  *G01T 3/00* (2006.01)
  *G01T 7/00* (2006.01)

(56) References Cited

U.S. PATENT DOCUMENTS

| | | |
|---|---|---|
| 2013/0206985 A1 | 8/2013 | Turner et al. |
| 2017/0223815 A1 | 8/2017 | Yamamoto et al. |
| 2018/0259462 A1 | 9/2018 | Otake et al. |
| 2019/0391279 A1 | 12/2019 | Suzuki |
| 2020/0196428 A1 | 6/2020 | Ryding et al. |

FOREIGN PATENT DOCUMENTS

| | | | | |
|---|---|---|---|---|
| GB | 2391734 A | * | 2/2004 | ............ F41H 11/12 |
| JP | H03-85403 A | | 4/1991 | |
| JP | 2977822 B1 | | 11/1999 | |
| JP | 2000-171564 A | | 6/2000 | |
| JP | 2010-175362 A | | 8/2010 | |
| JP | 2011185722 A | | 9/2011 | |
| JP | 2013174587 A | | 9/2013 | |
| JP | 2014-081209 A | | 5/2014 | |
| JP | 2017009558 A | | 1/2017 | |
| JP | 2018-119890 A | | 8/2018 | |
| JP | 2019-519071 A | | 7/2019 | |
| WO | 2011108709 A1 | | 9/2011 | |
| WO | 2016035151 A1 | | 3/2016 | |
| WO | 2017043581 A1 | | 3/2017 | |
| WO | 2017196659 A1 | | 11/2017 | |
| WO | 2018139456 A1 | | 8/2018 | |

OTHER PUBLICATIONS

Notice of Reasons for Refusal dated Jul. 26, 2022 in connection with Japanese Patent Application No. 2018-182814, 9 pgs. (including translation).

Final Notification of Reasons for Refusal dated Oct. 11, 2022 in connection with Japanese Patent Application No. 2018-182814, 10 pgs.

* cited by examiner

NONDESTRUCTIVE INSPECTING SYSTEM, AND NONDESTRUCTIVE INSPECTING METHOD

CROSS-REFERENCE TO RELATED APPLICATIONS

This application is a national stage under 35 U.S.C. 371 of International Patent Application No. PCT/JP2019/037501, filed Sep. 25, 2019, which claims priority to Japanese Patent Application No. 2018-182814, filed Sep. 27, 2018, the disclosures of which are incorporated herein by reference in their entirety.

TECHNICAL FIELD

The present disclosure relates to a non-destructive inspection system and a non-destructive inspection method both for use to non-destructively inspect an inspection object using neutrons.

BACKGROUND ART

In recent years, it has been desired to appropriately maintain, repair, or renew aging infrastructures (hereinafter, referred to as infrastructure constructions) such as roads, bridges, tunnels, and building structures.

To inspect such an infrastructure construction, non-destructive inspection is performed using radiation, such as X-rays, penetrating an object. This non-destructive inspection allows an internal structure of an inspection object to be analyzed without destroying the inspection object.

In particular, in recent years, apparatuses for non-destructive inspection using neutrons, which are more penetrating than X-rays, have also been studied. For example, Patent Document 1 discloses a mechanism for non-destructively inspecting the inside of a bridge using neutrons produced by a portable neutron source mounted on a vehicle that is travelling on the bridge.

CITATION LIST

Patent Document

Patent Document 1: WO 2016/035151

SUMMARY OF THE INVENTION

Technical Problem

An apparatus for non-destructive inspection using neutrons as described in Patent Document 1 includes a neutron emitter and a neutron detector; to allow the detector to detect neutrons that have penetrated an inspection object, the inspection object must be sandwiched between the neutron emitter and the neutron detector, which must be provided in the direction of emission of neutrons. In other words, the technique of Patent Document 1 is not applicable to inspection of an inspection object that does not allow the detector to be positioned further from the emitter than the inspection object is (e.g., the tunnel wall). Thus, the target to be inspected is limited.

To address this problem, the inspection object may be irradiated with neutrons, and back-scattered ones of the neutrons may be detected by the detector. According to this technique, the detector merely needs to be positioned closer to the emitter than the inspection object is. Thus, this technique is applicable also to inspection of an inspection object such as the tunnel wall.

However, in this technique, neutrons, which are invisible, prevent a location to which the neutrons are emitted from being accurately determined. Thus, from which portion of the inspection object the neutrons are back-scattered cannot be determined.

In particular, to analyze an infrastructure construction, the inspected spot needs to be accurately detected to associate the inspection object with a global coordinate (world coordinate). In other words, if the inspected location is not determined, the accuracy of analysis of the internal structure of the inspection object decreases, and a defective portion of the inspection object may be recognized in error.

An embodiment of the present invention has been made to solve the above-described problems, and it is therefore an object of the embodiment of the present invention to provide a non-destructive inspection system and a non-destructive inspection method which are for use in non-destructive inspection using neutrons and which allow an inspected location to be accurately determined to enable accurate analysis of an internal structure of an inspection object.

Solution to the Problem

To achieve the foregoing object, a non-destructive inspection system according to an embodiment of the present invention is directed to a non-destructive inspection system for inspecting a state of an inspection object using neutrons. The system includes: an emitter capable of emitting neutrons; a detecting unit movable relative to the inspection object, the detecting unit being configured to detect neutrons produced via the inspection object among neutrons emitted from the emitter; a position and posture detector capable of detecting a position and a posture of the detecting unit; and an arithmetic unit configured to generate information on the inspection object from information detected by the detecting unit. The detecting unit includes a collimator and a neutron detector integrated together. The collimator has a wall defining a through passage. The wall is made from a material that absorbs the neutrons produced via the inspection object. The neutron detector is capable of detecting neutrons that have passed through the collimator. The arithmetic unit generates information related to a position and composition of the inspection object, based on information on the neutrons detected by the neutron detector, positional information indicating the position of the detecting unit, and posture information indicating the posture of the detecting unit. The positional information and the posture information are detected by the position and posture detector.

The position and posture detector may generate the posture information on the detecting unit in accordance with an axial direction of the through passage of the collimator.

In the non-destructive inspection system, the detecting unit may further include a GNSS reception module, and the position and posture detector may generate the positional information on the detecting unit, based on information received by the GNSS reception module.

In the non-destructive inspection system, the detecting unit may further include a reflector capable of reflecting range-finding light, and the position and posture detector may generate the positional information and/or the posture information on the detecting unit, based on information from a surveying device configured to measure a position of the reflector using the range-finding light.

The non-destructive inspection system may further include a support directly or indirectly coupling the emitter and the detecting unit together; and a driving section configured to drive the support. The position and posture detector may detect the positional information and/or posture information on the detecting unit, based on information on a state of the driving section.

In the non-destructive inspection system, the neutron detector may detect neutrons back-scattered inside the inspection object.

In the non-destructive inspection system, the neutron detector may detect neutrons that have penetrated the inspection object.

In the non-destructive inspection system, the neutrons emitted by the emitter may be fast neutrons, the neutrons detected by the neutron detector may be thermal neutrons, and the wall of the collimator defining the through passage may be a material that is penetrated by the fast neutrons and that absorbs the thermal neutrons.

In the non-destructive inspection system, the arithmetic unit may generate information related to composition of the inspection object as color information corresponding to a type of the composition.

A non-destructive inspection method according to an embodiment of the present invention is directed to a non-destructive inspection method for inspecting a state of an inspection object using a detecting unit including a collimator and a neutron detector integrated together. The collimator has a wall defining a through passage. The wall is made from a material that absorbs neutrons produced via the inspection object. The neutron detector is capable of detecting neutrons that have passed through the collimator. The method includes: allowing an emitter to emit neutrons; allowing a position and posture detector to detect a position and a posture of the detecting unit; allowing the detecting unit that is movable relative to the inspection object to detect neutrons produced via the inspection object among the neutrons emitted from the emitter; and allowing an arithmetic unit to generate information on a position and composition of the inspection object, based on information on the neutrons detected by the neutron detector, positional information indicating the position of the detecting unit, and posture information indicating the posture of the detecting unit. The position information and the posture information are detected by the position and posture detector.

Advantages of the Invention

According to an embodiment of the present invention using the foregoing means, in non-destructive inspection of an inspection object using neutrons, an inspected location can be accurately determined to enable accurate analysis of an internal structure of the inspection object.

DESCRIPTION OF EMBODIMENTS

Embodiments of the present invention will now be described with reference to the drawings.

First Embodiment

Figure 1:
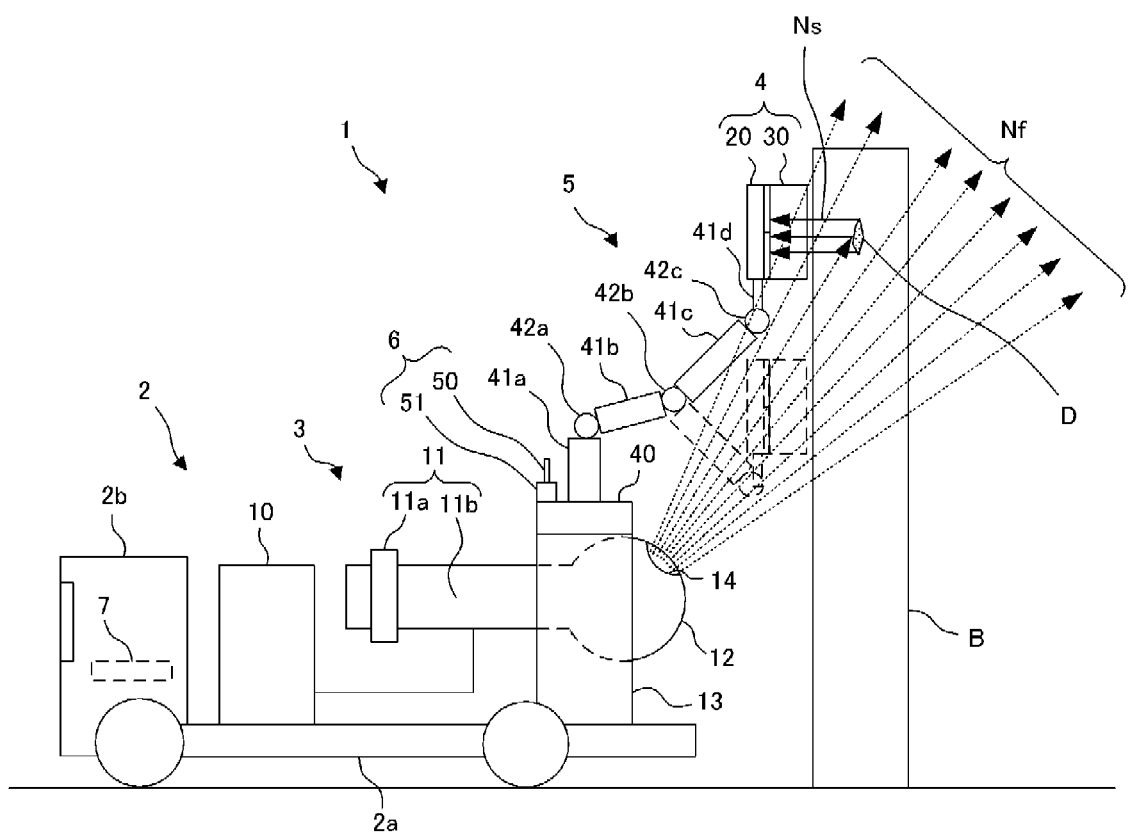
FIG. 1 is a general side view of an entire non-destructive inspection system according to a first embodiment of the present invention.
Figure 2:
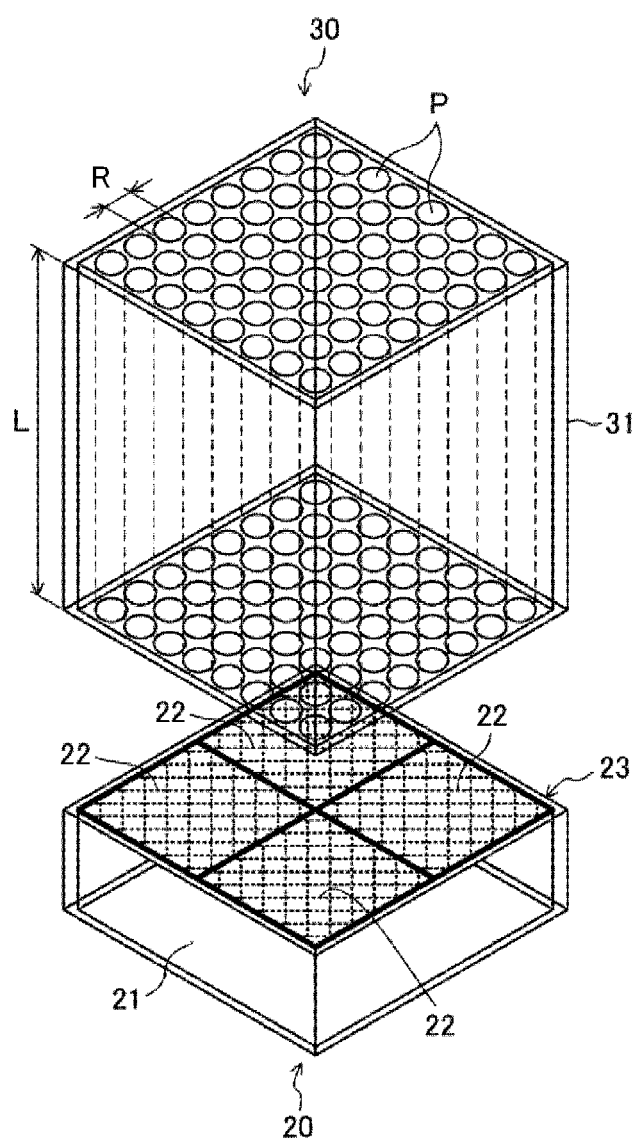
FIG. 2 is an exploded perspective view of a neutron detecting unit according to the first embodiment of the present invention.
Figure 3:
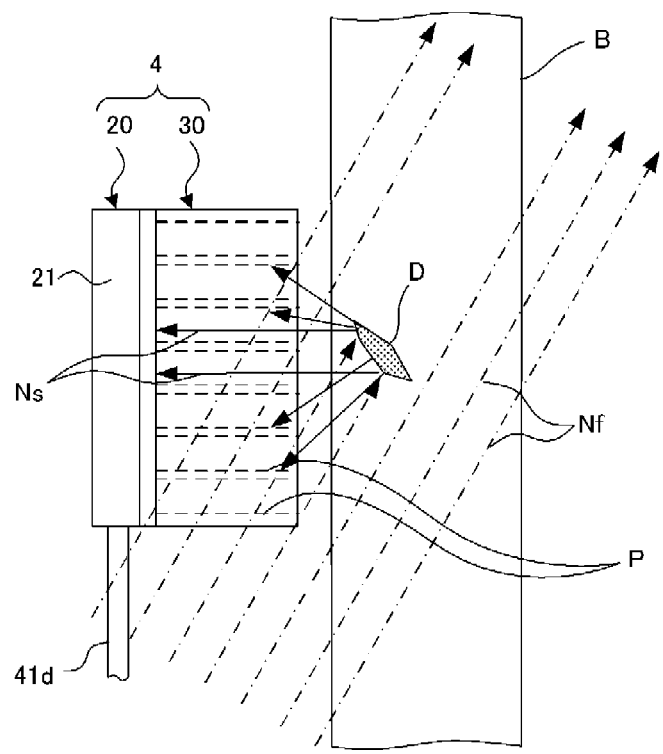
FIG. 3 is an enlarged view of the neutron detecting unit and its surrounding area.
Figure 4:
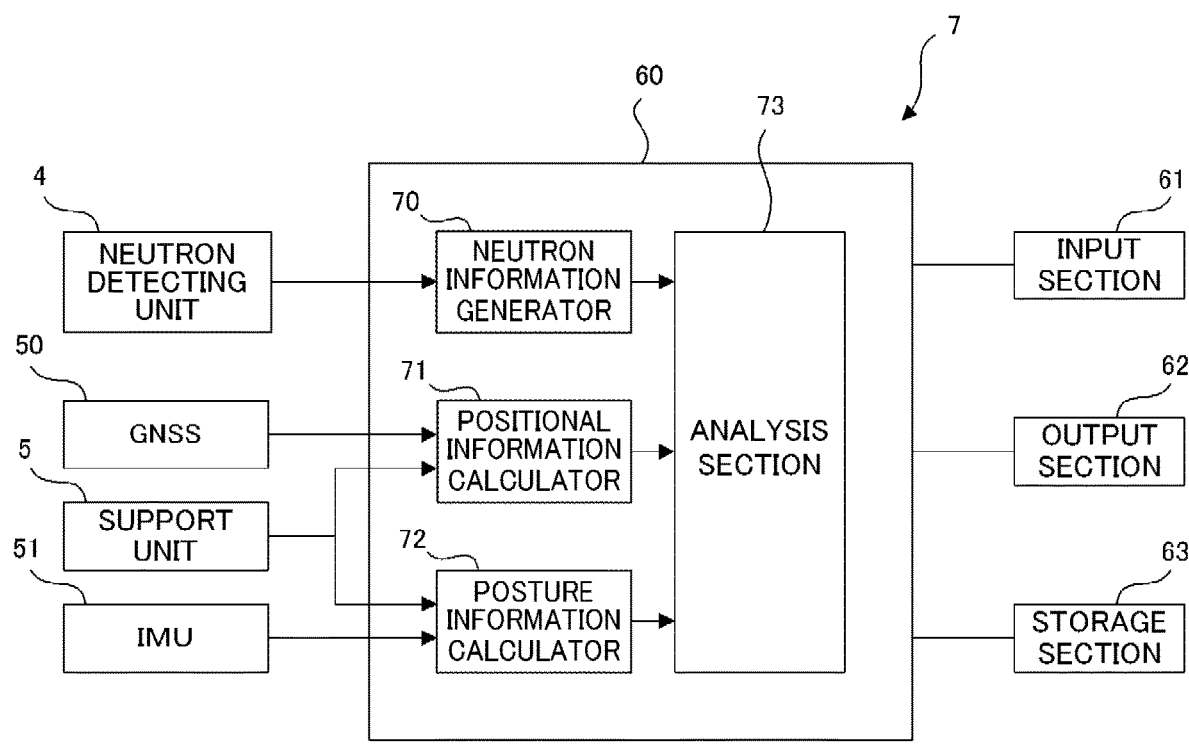
FIG. 4 is a block diagram illustrating a configuration of a control system of a non-destructive inspection system according to an embodiment of the present invention.

FIG. 1 is a general side view of an entire non-destructive inspection system according to a first embodiment of the present invention. FIG. 2 is an exploded perspective view of a neutron detecting unit (detecting unit) according to the first embodiment of the present invention. FIG. 3 is an enlarged view of the neutron detecting unit and its surrounding area. FIG. 4 is a block diagram illustrating a configuration of a control system of a non-destructive inspection system according to an embodiment of the present invention. The configuration of the non-destructive inspection system according to this embodiment will now be described with reference to these figures.

As illustrated in FIG. 1, a non-destructive inspection system 1 according to the first embodiment includes a portable neutron radiation source unit 3, a neutron detecting unit 4, a support unit 5, a position and posture detecting unit 6, and an analyzer 7 that are mounted on a vehicle 2, which is a mobile object. The vehicle 2 is, for example, a truck, which includes a platform 2a on which the portable neutron radiation source unit 3, the neutron detecting unit 4, the support unit 5, and the position and posture detecting unit 6 are mounted, and a driver's seat 2b on which the analyzer 7 is mounted. In this embodiment, a block B made from concrete is non-destructively inspected as an inspection object.

The portable neutron radiation source unit 3 includes: a power supply 10; a linear accelerator 11; and a target station 12 that serve as a neutron radiation source for generating neutrons; a holder 13 for the target station 12; and an emitter 14 that emits generated neutrons in a predetermined direction.

Specifically, the power supply 10 is a generator that supplies electric power to units. In one preferred embodiment, the generator of the power supply 10 has a power generation performance to enable generation of at least protons, generates small voltage fluctuations, and is resistant to harmonic current. The power supply 10 may include a battery capable of storing electric power generated by the generator.

The linear accelerator 11 includes an ion source 11a that generates protons, in the front of the vehicle 2, and the ion source 11a is connected through an accelerator 11b in a cylindrical shape to the target station 12. The accelerator 11b accelerates the protons generated by the ion source 11a, and irradiates the target station 12 with the accelerated protons as the proton beam.

The target station 12 is covered with a substantially spherical shield, and a target (not shown) for producing neutrons is provided inside the target station 12. The shield is made from a material that blocks neutrons and a gamma ray, and is made from lead or polyethylene containing boron, for example. The target collides with protons to produce neutrons (fast neutrons), and examples thereof include beryllium (Be). The target station 12 is held by the holder 13.

More specifically, the holder 13 is formed in the shape of a quadrangular prism standing on the platform 2a, and connected portions of the accelerator 11b and the target station 12 pass through the inside of the holder 13. A distal end portion of the target station 12 is exposed to the outside.

The emitter 14 is an opening of the target station 12, and can selectively emit fast neutrons directed in a predetermined direction among fast neutrons produced in the target station 12. The emitter 14 can change the position of the opening on the target station 12. Changing the position of the opening can trigger a change in the direction of emission of the fast neutrons.

The neutron detecting unit 4 is capable of detecting thermal neutrons directed in a predetermined direction, and includes a neutron detector 20 capable of detecting thermal neutrons, and a collimator 32 configured to increase the directivity of thermal neutrons incident on the neutron detector 20.

More specifically, as illustrated in FIG. 2, the neutron detector 20 includes cuboid-shaped detector body 21 having a surface on which four square detection modules 22 are arranged. These detection modules 22 are configured as one detector array 23. As can be seen, the detector array 23 forms a detection surface of the neutron detecting unit 4, and information on the size of the detection surface has already been known.

Each of the detection modules 22 includes a plurality of square detector elements arrayed on the detection surface in the lengthwise and widthwise directions with no gap left. The detector elements are not sensitive to fast neutrons, but are sensitive to thermal neutrons. The detector body 21 includes therein a power supply, a controller that controls the period during which the detector elements are exposed and the timing at which the detector elements are exposed, and a signal processor that receives detection signals of the detector elements and calculates associated coordinates in the detection surface and the intensity of neutrons. In other words, the neutron detector 20 can generate information on thermal neutrons detected by the detector elements. The neutron detector according to this embodiment includes the detector array including the four detection modules. However, the number of the detection modules forming part of the neutron detector is merely an example, and may be one, for example.

The collimator 30 includes a housing 31 having a plurality of through passages P extending in the same direction. Specifically, the housing 31 is formed in a cuboid. The through passages P are each defined by a wall formed in the shape of a tube having a circular cross section. The collimator 30 of this embodiment illustrated in FIG. 2 has an opening surface on which the openings of the through passages P are aligned in rows and columns. Each of the rows includes eight of the through passages P.

As illustrated in FIG. 3, the housing forming the collimator 30 and the wall forming each of the through passages P are a material penetrated by fast neutrons Nf and absorbing thermal neutrons Ns. Thus, the thermal neutrons Ns produced in a defect D and passing through the through passages P have directivity in an axial direction of the collimator 30 in which the thermal neutrons Ns pass through the collimator 30 without being absorbed by the wall, i.e., in an axial direction of the through passages P. Specifically, for example, cadmium (Cd) or boron (B) can be used as the wall.

Returning to FIG. 2, in one preferred embodiment, at least the diameter R of the opening of each of the through passages P is shorter than the length L of the through passage P, and to allow the angle at which the thermal neutrons Ns are incident on (received by) a detection surface of the neutron detector 20 to be substantially perpendicular, the ratio (R:L) of the opening diameter R to the passage length L is about 1:50.

The collimator 30 is in contact with the detection surface of the neutron detector 20 such that the through passages P are substantially perpendicular to the detection surface, and is thus integrated with the neutron detector 20.

Returning to FIG. 1, the support unit 5 includes a support stage 40, three arms 41a, 41b, 41c, and 41d, and three links 42a, 42b, and 42c each connecting two associated ones of the arms together in a turnable manner.

More specifically, the support stage 40 of the support unit 5 is placed on the holder 13 of the neutron radiation source unit 3. The horizontally turnable first arm 41a stands on the support stage 40. A distal end of the first arm 41a is connected to one end of the second arm 41b through the first link 42a. The second arm 41b is connected to the third arm 41c through the second link 42d, and the third arm 41c is connected to the fourth arm 41d through the third link 42c. A distal end of the fourth arm 41d is connected to the neutron detecting unit 4.

The links 42a, 42b, and 42c are turnable in the vertical direction. As can be seen, the support unit 5 has its horizontal orientation defined by the first arm 41a, and has its vertical orientation defined by the links 42a, 42b, and 42c. Thus, the position and posture of the neutron detecting unit 4 can be freely changed.

Further, driving portions of the support unit 5 are equipped with a plurality of encoders (not shown). For example, a horizontal angle detector (horizontal encoder) (not shown) that detects the angle of turning in the horizontal direction is mounted between the support stage 40 and the first arm 41a. Each of the links 42a, 42b, and 42c is provided with a vertical angle detector (vertical encoder) (not shown) that detects the angle of turning in the vertical direction. The lengths of the arms 41a, 41b, 41c, and 41d, the radii of the links 42a, 42b, and 42c, and the angle at which the fourth arm 41d is attached to the neutron detecting unit 4 are specified by specifications, and have already been known.

The position and posture detecting unit 6 includes a global navigation satellite system (GNSS 50) and an inertial measurement unit (GNSS 50).

The GNSS 50 is, for example, a global positioning system (GPS), and is provided on the support stage 40 of the support unit 5. The GNSS 50 is capable of receiving information from satellites to detect its own position coordinate, i.e., positional information on the support stage 40. In addition, the distance between the GNSS 50 and the first arm 41a has already been known, and determining the position coordinate of the GNSS 50 allows the position coordinate of the first arm 41a to be also determined.

The IMU 51 is an inertial navigation system, and is a system including, for example, a gyrocompass or a compass. Just like the GNSS 50, the IMU 51 is provided on the support stage 40, and is capable of detecting the inclination of the support stage 40 (posture information), i.e., posture information on the vehicle 2.

The neutron detecting unit 4, the support unit 5, and the position and posture detecting unit 6 described above are connected to the analyzer 7 by wire or wirelessly so as to be able to communicate with the analyzer 7.

The analyzer 7 is, for example, a personal computer, and includes: an arithmetic processor (arithmetic unit) 60 including a central processing unit (CPU); an input section 61 including a keyboard and a mouse; an output section 62 including a display; and a storage section 63 including a hard disk and a memory, as illustrated in FIG. 4. For example, the storage section 63 stores the known information described above.

Further, the arithmetic processor 60 includes a neutron information generator 70 for executing a program as analysis software for non-destructive inspection, a positional information calculator 71, a posture information calculator 72, and an analysis section 73.

The neutron information generator 70 acquires information on the thermal neutrons detected by the neutron detector 20 from the neutron detecting unit 4, and generates neutron information. For example, information on the distribution of the intensity of thermal neutrons in the detection surface of the neutron detector 20 is generated.

The positional information calculator 71 acquires information on the position coordinate detected by the GNSS 50 and information on the encoders of the support unit 5, i.e., the angle of turning of the first arm 41a in the horizontal direction and the angles of turning of the links 42a, 42b, and 42c in the vertical direction. The positional information calculator 71 further acquires the known information stored in the storage section 63, i.e., information such as the distance between the GNSS 50 and the first arm 41a, the lengths of the arms 41a, 41b, 41c, and 41d, the radii of the links 42a, 42b, and 42c, the angle at which the fourth arm 41d is attached to the neutron detecting unit 4, and the size of the detection surface. The positional information on the neutron detecting unit 4 is calculated based on these pieces of information. The positional information on the neutron detecting unit 4 is calculated as, for example, a global coordinate.

The posture information calculator 72 calculates the posture information on the neutron detecting unit 4 based on the posture information detected by the IMU 51 and the above-described information on the encoders of the support unit 5. Specifically, the posture information calculator 72 calculates the axial direction of the collimator, i.e., the orientation of the detection surface of the neutron detecting unit 4.

The analysis section 73 acquires the neutron information generated by the neutron information generator 70, the positional information indicating the position of the neutron detecting unit 4 calculated by the positional information calculator 71, and the posture information indicating the posture of the neutron detecting unit 4 calculated by the posture information calculator 72. Then, the analysis section 73 generates information related to the position and composition of the block B serving as an inspection object, from these pieces of information, and can output the generated information as the analysis result to the output section 62 and the storage section 63, for example.

Next, a non-destructive inspection technique performed by the non-destructive inspection system 1 configured as described above will be described with reference to the above-described figures.

First, before the non-destructive inspection is performed, a traveling route of the vehicle 2, the location at which the inspection object is to be inspected, and other elements are planned. Then, the vehicle 2 is driven in accordance with the plan, and neutrons are emitted to the inspection object by the neutron radiation source unit 3 while the vehicle 2 is stopped or driven at the predetermined location planned. In parallel, the support unit 5 is driven to move the neutron detecting unit 4 to a target location to be inspected.

Specifically, to emit neutrons, first, electric power is supplied from the power supply 10 to the ion source 11a of the linear accelerator 11 to generate protons, which are accelerated through the accelerator 11b to collide with the target inside the target station 12, thereby producing fast neutrons. Out of the fast neutrons spread from the target, only the fast neutrons Nf traveling in a predetermined direction are emitted from the emitter 14 toward the inspection object (the block B in this embodiment).

Meanwhile, the neutron detecting unit 4 moves to the vicinity of an inspection target portion of the inspection object through driving of the actuators of the support unit 5, and is positioned to have an orientation in which its detection surface faces the inspection target portion, i.e., a posture in which the inspection target portion lies on the extensions of the axes of the through passages P of the collimator 30. At this time, the distal end of the collimator 30 may be in contact with the block B, which is the inspection object, or may be spaced apart from the block B by a predetermined distance. If the distal end of the collimator 30 is in contact with the block B, consideration does not have to be given to the distance between the neutron detecting unit 4 and the inspection object during analysis performed by the analyzer 7 and described below. On the other hand, if the distal end of the collimator 30 is spaced apart from the block B, the position of the neutron detecting unit 4 may be determined by the support unit 5 so that the distance between the distal end and the block B is equal to the predetermined distance. Alternatively, the distance may be measured using a distance sensor or any other suitable sensor (not shown).

As illustrated in FIG. 3, some of the fast neutrons Nf emitted to the block B penetrate the block B as they are. The remaining fast neutrons are scattered as thermal neutrons Ns inside the block B. In particular, if the defect D in the block B contains a larger amount of a light element, such as water, than that of concrete, the fast neutrons Nf in the defect D have their energy taken away by the light element. As a result, relatively more thermal neutrons are produced in the defect D than in the other portions of the block B. On the other hand, if the defect D is a void, thermal neutrons Ns are not produced in the void, and are not thus scattered. The amount (intensity) of thermal neutrons is relatively smaller than that in the other portions of the block B.

The collimator 30 of the neutron detecting unit 4 regulates the scattered thermal neutrons Ns, and allows only the thermal neutron beam Ns directed substantially perpendicularly to the detection surface of the neutron detector 20 to selectively pass therethrough. For example, as illustrated in FIG. 3, out of the thermal neutrons Ns back-scattered from the defect D, only thermal neutrons Ns incident on the detection surface in a direction substantially perpendicular to the detection surface pass through the through passages P. Meanwhile, the other thermal neutrons Ns incident on the collimator 30 at an angle with respect to the axial direction of the through passages P are absorbed by the walls.

The neutron detector 20 detects the thermal neutrons Ns that have been incident thereon, and outputs information on the thermal neutrons (e.g., the number of the incident thermal neutrons Ns) to the neutron information generator 70 of the analyzer 7.

In addition, the positional information calculator 71 acquires information on the position coordinate at this moment and information on the encoders from the GNSS 50 and the support unit 5 to calculate the positional information on the neutron detecting unit 4. The posture information calculator 72 acquires the information on the encoders from the support unit 5 and the posture information from the IMU 51 to calculate the posture information on the neutron detecting unit 4.

Then, the analysis section 73 acquires the neutron information, and the positional information and posture information on the neutron detecting unit 4, to generate information related to the position and composition of the block B serving as the inspection object, and outputs the generated information as the analysis result to the output section 62 and the storage section 63.

More specifically, the neutron information detected by the neutron detecting unit 4 is based on the information on only the thermal neutrons Ns directed in the direction perpendicular to the detection surface by the collimator 30. Thus, the internal structure of a portion of the block B that lies on the extensions of the axes of the through passages P can be determined. Then, the global coordinates in the internal structure of the block B can be calculated from the global coordinate of the neutron detecting unit 4 calculated based on the positional information and posture information on the neutron detecting unit 4.

Figure 5:
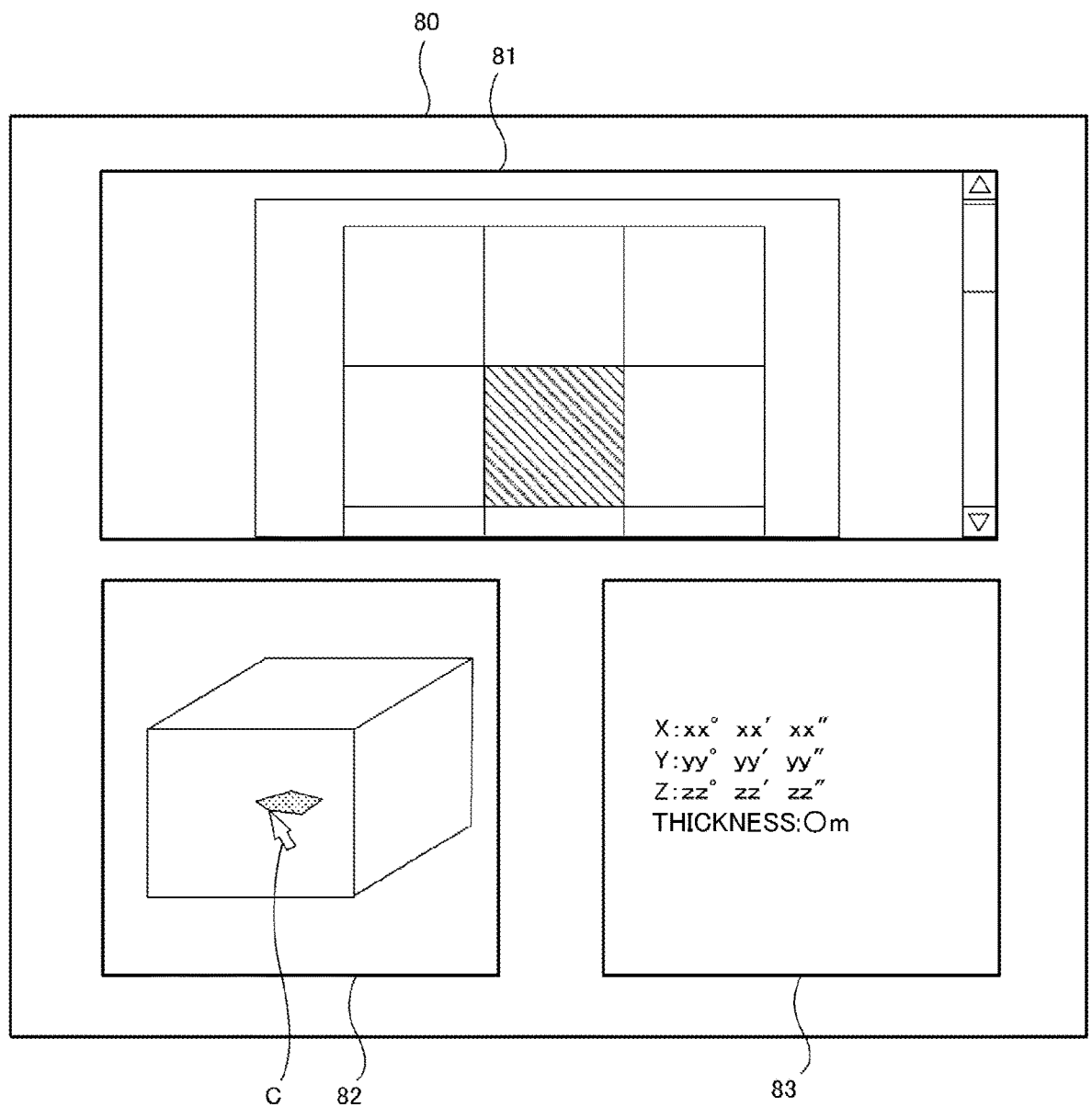
FIG. 5 illustrates an exemplary screen indicating an analysis result output to an output section of an analyzer.

For example, FIG. 5 illustrates an exemplary screen indicating an analysis result output to the output section 62.

In the example illustrated in FIG. 5, a screen 80 has an upper frame 81, a lower left frame 82, and a lower right frame 83. The upper frame 81 shows a general overall view of the block. The lower left frame 82 shows a cross-sectional view thereof. The lower right frame 83 shows various kinds of information. Specifically, the upper frame 81 shows a side view of the block B, and areas of the block B that have had their internal structures analyzed are indicated by rectangular frames. Selecting one of the rectangular frames via the input section 61 allows a cross-sectional view of the selected area to be displayed on the lower left frame 82. Note that in FIG. 5, the selected rectangular frame is hatched.

The cross-sectional view displayed on the lower left frame 52 allows the internal structure to be visually checked. This allows the presence of a defect, such as water, a void, or rust, to be recognized. In particular, information related to the composition of the inspection object is displayed as color information corresponding to the type of the composition, such that, for example, water is colored in light blue, a void in gray, and rust in red.

For example, moving a cursor to the inside of the cross-sectional view allows positional information on a location indicated by the cursor to be displayed in the lower right frame 83. Thus, if the position of the defect is indicated by the cursor, positional information on a defective location can be acquired. In FIG. 5, the cross-sectional view is displayed as a three-dimensional image, but may be displayed as a two-dimensional image.

As can be seen, according to the non-destructive inspection system 1 of this embodiment, the neutron detecting unit 4 regulates the thermal neutrons Ns incident on the neutron detector 20 through the collimator 30. Thus, the information on the thermal neutrons Ns detected by the neutron detector 20 can be determined to correspond to information on which portion of the inspection object produces the thermal neutrons Ns. Specifically, determining the axial direction of the through passages P of the collimator 30 allows a position in the inspection object detected by the neutron detector 20 to be determined. Thus, the posture information on the neutron detecting unit 4 is generated in accordance with the axial direction of the through passages P of the collimator 30.

Then, the support unit 5 and the position and posture detecting unit 6 determine the position and posture of the neutron detecting unit 4, and associate the positions of the neutron detecting unit 4 and the inspection object with each other. Thus, an inspected internal location of the inspection object can be accurately determined. This allows the internal structure of the inspection object to be accurately analyzed.

In particular, in this embodiment, the positional information on the neutron detecting unit 4 is calculated using the GNSS 50 and the encoders of the support unit 5, and the posture information on the neutron detecting unit 4 is calculated using the IMU and the encoders of the support unit. Thus, the position and posture of the neutron detecting unit 4 can be easily determined.

The neutron detecting unit 4, which detects the thermal neutrons back-scattered inside the inspection object, can be disposed to be closer to the neutron radiation source than the inspection object is. Thus, the neutron detecting unit 4 can be easily installed.

The analysis section 73 of the analyzer 7 generates information related to the composition of the inspection object as color information corresponding to the type of composition, such that, for example, water is colored in light blue, a void in gray, and rust in red. Thus, an operator can easily understand the position of a defect based on the resultant information.

The position and posture detecting unit 6 of the non-destructive inspection system 1 may be provided on the neutron detecting unit 4 instead of on the support stage 40 of the support unit 5. In this case, the positional information calculator 71 and the posture information calculator 72 can calculate the positional information and posture information on the neutron detecting unit 4 without relying on the information on the support unit 5.

Second Embodiment

Figure 6:
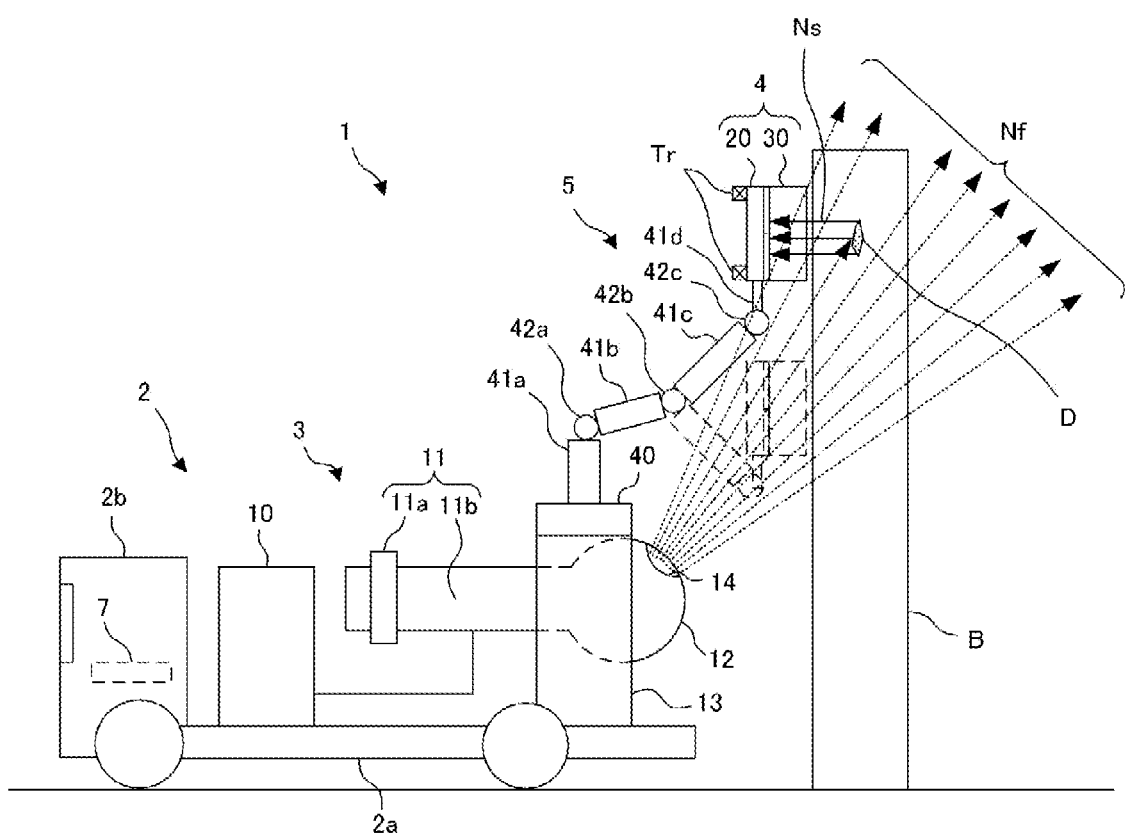
FIG. 6 is a general side view of an entire non-destructive inspection system according to a second embodiment of the present invention.
Figure 6:
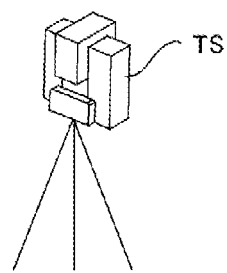
Figure 7A:
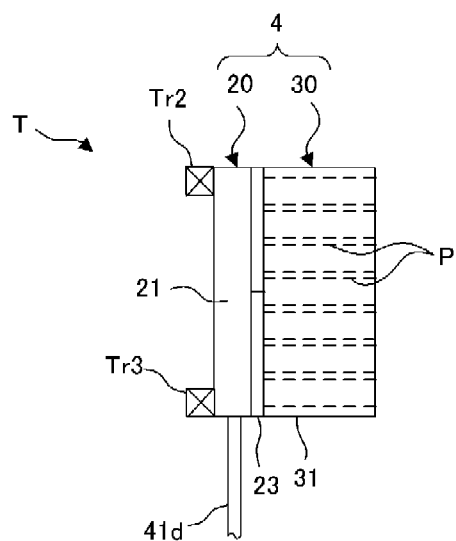
FIG. 7A is an enlarged view of a neutron detecting unit according to the second embodiment of the present invention.
Figure 7B:
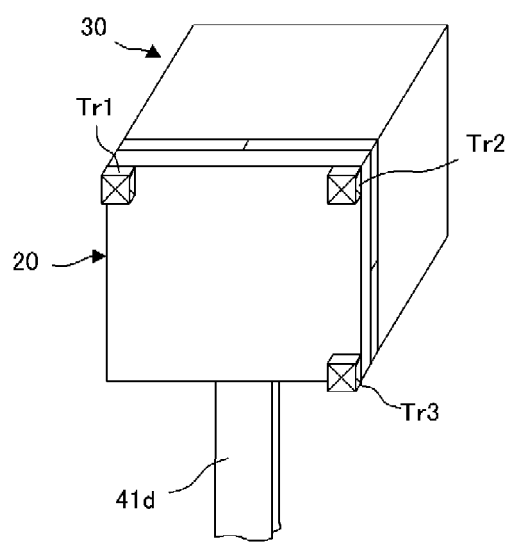
FIG. 7B is a perspective view of the neutron detecting unit according to the second embodiment of the present invention as viewed from the back thereof.

Next, a second embodiment will be described below with reference to FIGS. 6 to 7B. FIG. 6 illustrates a configuration of an entire non-destructive inspection system according to a second embodiment of the present invention. FIG. 7A is a side view of a neutron detecting unit according to the second embodiment. FIG. 7B is a perspective view of the neutron detecting unit as viewed from the back thereof. The same reference characters are given to the same components as those of the first embodiment, and a detailed description thereof is omitted.

The non-destructive inspection system 1' of the second embodiment includes a position and posture detecting unit including a surveying device TS and reflectors Tr as illustrated in FIG. 6, instead of the position and posture detecting unit 50 of the non-destructive inspection system 1 of the first embodiment including the GNSS 50 and the IMU 51.

The surveying device TS is, for example, a total station, and is installed at a location where a survey can be performed outside the vehicle 2, such as a known point. The surveying device TS irradiates the reflectors Tr serving as targets with range-finding light, receives light reflected by the reflectors Tr, and can thus measure the distances to the reflectors Tr and the directions of the reflectors Tr. Irradiating the reflectors Tr with tracking light allows the reflectors Tr to be tracked. In one preferred embodiment, the surveying device TS can communicate with the analyzer 7, and can transmit the measurement result to the analyzer 7. Alternatively, the measurement result may be transferred to the analyzer 7 via a storage medium or any other suitable medium after the end of the inspection.

As illustrated in FIGS. 7A and 7B, the three reflectors Tr are attached to the neutron detecting unit 4. More specifically, the first reflector Tr1, the second reflector Tr2, and the third reflector Tr3 are placed at three of four corners of the back surface of the detector body 21. The positions of these three corners of the neutron detecting unit 4 have already been known, and the associated positional information is stored in the storage section 63. That is to say, the surveying device TS acquires surveying information on these three positions so as to be capable of calculating the positional information and posture information on the neutron detecting unit 4. If at least the positional information on the three positions is acquired, the positional information and posture information on the neutron detecting unit 4 can be calculated. However, four or more reflectors may be provided.

The configuration itself of the analyzer 7 of this embodiment is similar to that in the first embodiment. However, the positional information calculator 71 and the posture information calculator 72 calculate the positional information and posture information on the neutron detecting unit 4 using the surveying information acquired from the surveying device TS.

The other features and the non-destructive inspection technique are the same as those in the first embodiment. The non-destructive inspection system 1 of the second embodiment can provide advantages similar to those of the first embodiment.

In addition, generating the positional information and posture information on the neutron detecting unit 4 using the surveying device TS and the reflectors Tr allows even an inspection object on which satellite information cannot be acquired, such as a tunnel, a building, or any object under a bridge, to be inspected.

Third Embodiment

Figure 8:
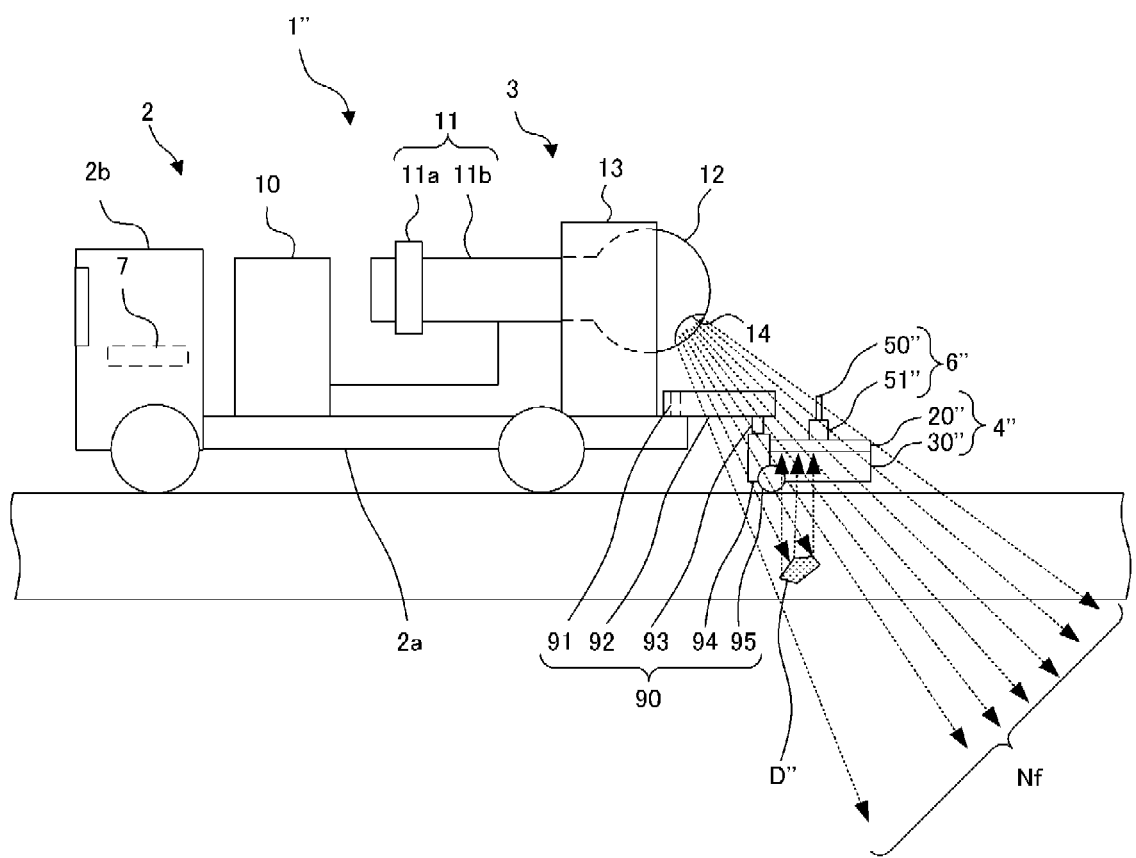
FIG. 8 is a general side view of an entire non-destructive inspection system according to a third embodiment of the present invention.
Figure 9:
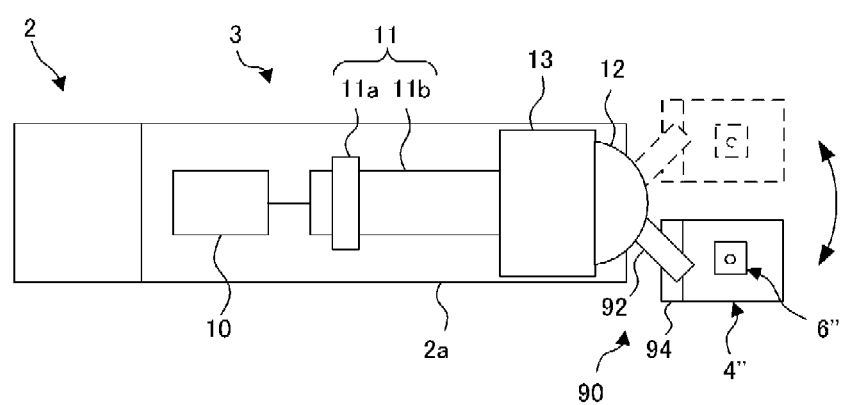
FIG. 9 is a general top view of the entire non-destructive inspection system according to the third embodiment of the present invention.

Next, a third embodiment will be described below with reference to FIGS. 8 and 9. FIG. 8 illustrates a configuration of an entire non-destructive inspection system according to a third embodiment of the present invention. FIG. 9 is an enlarged top view of the non-destructive inspection system. The same reference characters are given to the same components as those of the first embodiment, and a detailed description thereof is omitted.

The non-destructive inspection system 1" of the third embodiment includes a neutron detecting unit 4" and a support unit 90 that are movable in the lateral direction of a vehicle 2 while following the vehicle 2 as illustrated in FIGS. 8 and 9, instead of the neutron detecting unit 4 and the support unit 5 of the non-destructive inspection system 1, 1' of each of the first and second embodiments. The non-destructive inspection system 1" inspects mainly a deck of a bridge, a road, or any other object as an inspection object. A position and posture detecting unit 6" of the third embodiment includes a GNSS 50" and a GNSS 50", and is attached to the neutron detecting unit 4".

More specifically, as illustrated in FIGS. 8 and 9, the neutron detecting unit 4" of the third embodiment includes a neutron detector 20" and a collimator 30", and its configuration itself is similar to that of each of the foregoing embodiments. However, since the inspection object is a deck of a bridge, a road, or any other object, the axial direction of the through passages of the collimator 30" is directed downward. That is to say, a detection surface of the neutron detector 20" is parallel to the road surface.

The support unit 90 of the third embodiment includes a first pivot 91, an arm 92, a second pivot 93, a support bracket 94, and support wheels 95, and supports the neutron detecting unit 4" so as to be capable of following the vehicle 2.

The first pivot 91 is provided on a rear portion of a platform 2a of the vehicle 2, and supports the front end of the arm 92 such that the arm 92 is turnable in the horizontal direction. The rear end of the arm 92 is connected to the support bracket 94 via the second pivot 93, and the support bracket 94 is turnable in the horizontal direction with respect to the arm 92. The support bracket 94 is integrated with the neutron detecting unit 4", and supports the support wheels 95 such that the support wheels 95 are rotatable.

The first and second pivots 91 and 93 are each equipped with an actuator that can be driven to turn in the horizontal direction, and a horizontal angle detector (horizontal encoder) that detects the angle of turning in the horizontal direction. The length of the arm 92, the size of the support bracket 94, the radius of the support wheels, and other elements are specified by specifications, and have already been known. These pieces of information are stored in the storage section 63 of the analyzer 7.

A neutron radiation source unit 3 of the third embodiment has its emitter 14 directed toward the road surface, and irradiates the road surface with fast neutrons Nf. The neutron detecting unit 4" detects thermal neutrons Ns scattered from the road surface.

As illustrated in FIG. 9, the support unit 90 can move the neutron detecting unit 4" in the vehicle width direction by driving the first and second pivots. The direction of emission of the fast neutrons Nf from the emitter 14 of the neutron radiation source unit 3 and the position of the neutron detecting unit 4" may be associated with each other. Alternatively, emitting the fast neutrons Nf from the emitter 14 toward a wide area and moving the neutron detecting unit 4" within the wide area may change the range where detection is performed.

The other features and the non-destructive inspection technique are the same as those in the first embodiment. The non-destructive inspection system 1 of the third embodiment can provide advantages similar to those of the first embodiment.

A position and posture detecting unit 5" may be replaced with a surveying device and reflectors just like the second embodiment to determine the position of the neutron detecting unit 4".

The embodiments of the present invention have been described hereinabove. However, the present invention is not limited to the embodiments described above.

In each of the non-destructive inspection systems 1, 1', and 1" of the foregoing embodiments, the neutron detecting unit 4, 4" is positioned between the neutron radiation source unit 3 and the inspection object, and detects the thermal neutrons Ns back-scattered from the inspection object. However, such a feature is merely an example. The foregoing embodiments of the present invention are applicable also to, for example, a configuration in which a neutron detecting unit is disposed to be further from a neutron radiation source unit than an inspection object to detect thermal neutrons scattered from the inspection object.

DESCRIPTION OF REFERENCE CHARACTERS

1, 1', 1" Non-destructive Inspection System
2 Vehicle
3 Neutron Radiation Source Unit 4 Neutron Detecting Unit
5 Support Unit
6 Position And Posture Detecting Unit
7 Analyzer
12 Target Station
13 Holder
14 Emitter
20 Neutron Detector
30 Collimator
21a. Support Stage
41a to 41d Arm
42a to 42c Link
50 GNSS
51 IMU

The invention claimed is:

1. A non-destructive inspection system for inspecting a state of an inspection object using neutrons, the system comprising:
an emitter capable of emitting neutrons;
a detecting unit movable relative to the inspection object, the detecting unit being configured to detect neutrons produced via the inspection object among neutrons emitted from the emitter;
a position and posture detector capable of detecting a position and a posture of the detecting unit; and
an arithmetic unit configured to generate information on the inspection object from information detected by the detecting unit,
the detecting unit including a collimator and a neutron detector integrated together, the collimator having a wall defining a through passage, the wall being made from a material that absorbs the neutrons produced via the inspection object, the neutron detector being capable of detecting neutrons that have passed through the collimator,
the arithmetic unit generating information related to a position and composition of the inspection object, based on information on the neutrons detected by the neutron detector, positional information indicating the position of the detecting unit, and posture information indicating the posture of the detecting unit, the positional information and the posture information being detected by the position and posture detector.

2. The non-destructive inspection system of claim 1, wherein
the position and posture detector generates the posture information on the detecting unit in accordance with an axial direction of the through passage of the collimator.

3. The non-destructive inspection system of claim 1, wherein
the detecting unit further includes a GNSS reception module, and
the position and posture detector generates the positional information on the detecting unit, based on information received by the GNSS reception module.

4. The non-destructive inspection system of claim 1, wherein
the detecting unit further includes a reflector capable of reflecting range-finding light, and
the position and posture detector generates the positional information and/or the posture information on the detecting unit, based on information from a surveying device configured to measure a position of the reflector using the range-finding light.

5. The non-destructive inspection system of claim 1, further comprising:
a support directly or indirectly coupling the emitter and the detecting unit together; and a driving section configured to drive the support, wherein
the position and posture detector detects the positional information and/or posture information on the detecting unit, based on information on a state of the driving section.

6. The non-destructive inspection system of claim 1, wherein
the neutron detector detects neutrons back-scattered inside the inspection object.

7. The non-destructive inspection system of claim 1, wherein
the neutron detector detects neutrons that have penetrated the inspection object.

8. The non-destructive inspection system of claim 1, wherein
the neutrons emitted by the emitter are fast neutrons,
the neutrons detected by the detecting unit are thermal neutrons, and
the wall of the collimator defining the through passage is made from a material that is penetrated by the fast neutrons and that absorbs the thermal neutrons.

9. The non-destructive inspection system of claim 1, wherein
the arithmetic unit generates information related to composition of the inspection object as color information corresponding to a type of the composition.

10. A non-destructive inspection method for inspecting a state of an inspection object using a detecting unit including a collimator and a neutron detector integrated together, the collimator having a wall defining a through passage, the wall being made from a material that absorbs neutrons produced via the inspection object, the neutron detector being capable of detecting neutrons that have passed through the collimator, the method comprising:
allowing an emitter to emit neutrons;
allowing a position and posture detector to detect a position and a posture of the detecting unit;
allowing the detecting unit that is movable relative to the inspection object to detect neutrons produced via the inspection object among the neutrons emitted from the emitter; and
allowing an arithmetic unit to generate information on a position and composition of the inspection object, based on information on the neutrons detected by the neutron detector, positional information indicating the position of the detecting unit, and posture information indicating the posture of the detecting unit, the position information and the posture information being detected by the position and posture detector.

* * * * *